US012573921B2

(12) United States Patent
Ranjbar

(10) Patent No.: US 12,573,921 B2
(45) Date of Patent: Mar. 10, 2026

(54) ELECTRO-MAGNETIC SHIELD TO PREVENT BEARING AND/OR GEARBOX DAMAGE DUE TO SHAFT INDUCED VOLTAGE IN ELECTRIC MOTORS

(71) Applicant: Canoo Technologies Inc., Torrance, CA (US)

(72) Inventor: Amir Ranjbar, Commerce Township, MI (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 264 days.

(21) Appl. No.: 18/399,108

(22) Filed: Dec. 28, 2023

(65) Prior Publication Data

US 2025/0219512 A1     Jul. 3, 2025

(51) Int. Cl.
*H02K 11/40*      (2016.01)
*H02K 3/12*       (2006.01)
*H02K 11/00*      (2016.01)

(52) U.S. Cl.
CPC ............... *H02K 11/40* (2016.01); *H02K 3/12* (2013.01); *H02K 11/0094* (2013.01)

(58) Field of Classification Search
CPC ......... H02K 3/12; H02K 11/094; H02K 11/40
USPC ....................................... 310/68 R
See application file for complete search history.

(56) References Cited

U.S. PATENT DOCUMENTS

| | | | | |
|---|---|---|---|---|
| 4,949,001 A | * | 8/1990 | Campbell | H02K 11/20 |
| | | | | 333/24 C |
| 5,319,276 A | * | 6/1994 | Schuler | H02K 3/40 |
| | | | | 310/196 |
| 5,661,353 A | * | 8/1997 | Erdman | H02K 11/0141 |
| | | | | 310/85 |
| 5,821,649 A | * | 10/1998 | Langhorst | H01R 13/6485 |
| | | | | 310/71 |
| 5,979,087 A | * | 11/1999 | Bell | H02K 3/487 |
| | | | | 310/260 |
| 6,202,285 B1 | * | 3/2001 | Bell | H02K 15/12 |
| | | | | 310/85 |
| 6,570,291 B1 | * | 5/2003 | Spaggiari | H02K 7/04 |
| | | | | 310/214 |
| 7,136,271 B2 | | 11/2006 | Oh et al. | |
| 7,193,836 B2 | | 3/2007 | Oh et al. | |
| 9,343,939 B2 | * | 5/2016 | Schutten | H02K 11/014 |
| 9,812,935 B2 | * | 11/2017 | Klopp | H02K 11/014 |
| 2023/0275484 A1 | | 8/2023 | Dameron et al. | |
| 2025/0219512 A1 | * | 7/2025 | Ranjbar | H02K 11/0094 |

* cited by examiner

*Primary Examiner* — Rashad H Johnson

(74) *Attorney, Agent, or Firm* — ALLEN, DYER, DOPPELT + GILCHRIST, P.A.

(57)                 ABSTRACT

Common mode voltage discharge shields are disposed over end turns of stator windings for a three phase electric traction motor within an electric vehicle. The common mode voltage discharge shields are capacitively coupled to the end turns to a ground strap, providing a low impedance path for common mode voltages accumulating at a neutral for electric traction motor as a result of high frequency switching of the motor drive voltage to produce desired torque. An insulating layer separates the common mode voltage discharge shields from the end turns. Accumulation of the common mode voltage in excess of a bearing breakdown voltage, and the associated potential for discharge through bearings between the stator and rotor and electrical discharge machining, is reduced or eliminated.

20 Claims, 8 Drawing Sheets

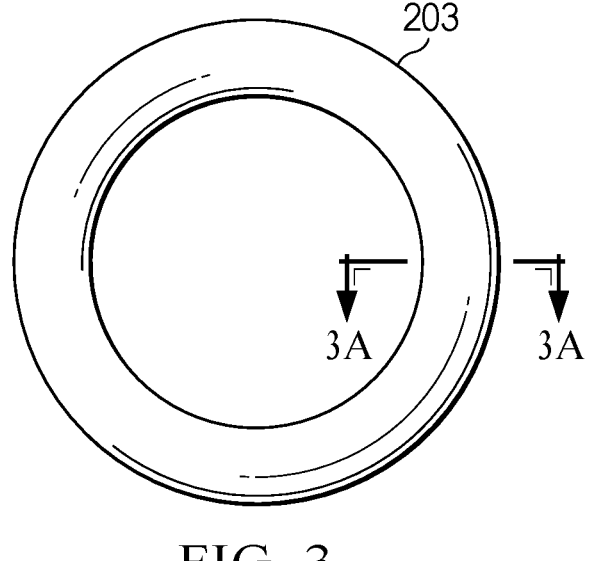
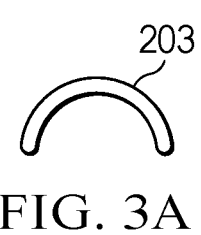
FIG. 3A
FIG. 3
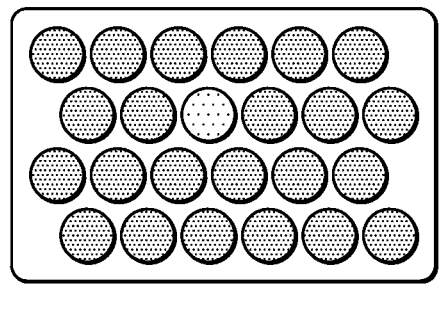
FIG. 4
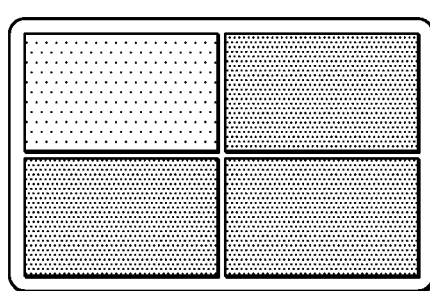
FIG. 5

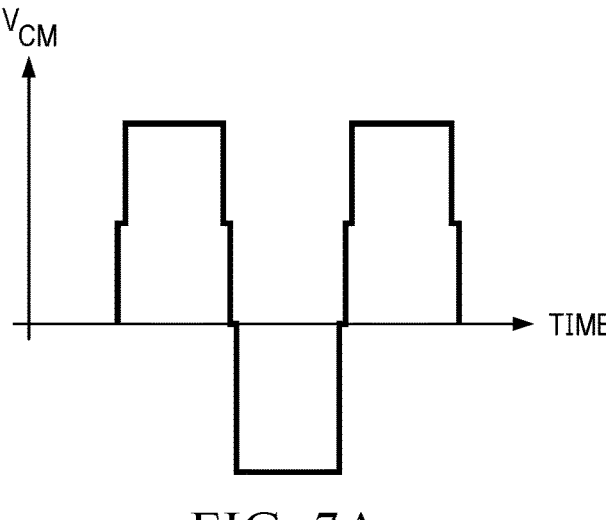
FIG. 7A
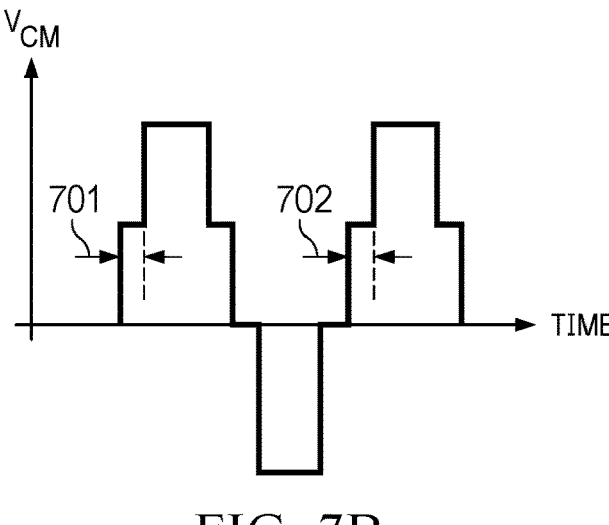
FIG. 7B
FIG. 7C

ELECTRO-MAGNETIC SHIELD TO PREVENT BEARING AND/OR GEARBOX DAMAGE DUE TO SHAFT INDUCED VOLTAGE IN ELECTRIC MOTORS

TECHNICAL FIELD

This disclosure relates generally to common mode voltage accumulation in the rotor shaft of an electric traction motor for an electric vehicle. More specifically, this disclosure relates avoiding discharge of common mode voltage through the motor bearings.

BACKGROUND

Pulse width modulation (PWM) switching of three-phase electric motor drives induces a high frequency voltage on the neutral point of the stator. That voltage, typically referred to as common mode voltage ($V_{CM}$), will find a discharge path, usually through the bearings between the rotor and motor's housing assembly. Current discharge through the bearings, also known as electrical discharge machining (EDM), causes severe stress and physical damage such as pitting and/or "frosting" of the bearings, or degradation of the bearing grease, that leads to early bearing failures.

One approach to addressing common mode voltage is a bearing protection ring using brushes that provide an electrical short between the rotor shaft and the motor housing (and chassis). In lieu of discharge through the bearings, the brushes provide a lower resistance path to the housing/chassis. However, the additional part(s) are relatively expensive, and add to vehicle weight. Moreover, the voltage still builds up on the rotor shaft (induced from $V_{CM}$ on the stator). Since the rotor is connected to the gearbox, in practice the gears may end up supplying a lower resistance path than the protection ring brushes, such that discharge occurs through the gears to the chassis instead of those brushes, resulting in damage on the gear teeth. While addressing bearing discharge current and associated failures, the problem is merely transferred to gears and/or other potential paths for electric discharge. In addition, the bearing protection ring structure cannot resolve the bearing discharge issue when that issue is due to stator's circulating current.

Another approach to addressing common mode voltage is interposing non-conductive structure, such as ceramic or ceramic-coated bearings rather than regular steel bearings or ceramic coating of the bearing races, within the bearing discharge path. Using ceramic bearings instead of regular steel bearings. This way, the bearing balls will be electrically isolated from the rotor and/or stator. Therefore, due to the high resistance provided by the bearings inner and outer ceramic races, the discharge cannot occur through the bearings. The shaft is still going to have induced voltage that cannot be discharged through the bearings, and instead will occur through the gear box, resulting in gearbox teeth damage. Further, ceramic bearings are expensive and not available in the same variety of sizes as steel bearings.

SUMMARY

This disclosure relates to avoiding discharge of common mode voltage through bearings within the electric traction motor for a vehicle.

Common mode voltage discharge shields are disposed over end turns of stator windings for a three phase electric traction motor within an electric vehicle. The common mode voltage discharge shields are capacitively coupled to the end turns to a ground strap, providing a low impedance path for common mode voltages accumulating at a neutral for electric traction motor as a result of high frequency switching of the motor drive voltage to produce desired torque. An insulating layer separates the common mode voltage discharge shields from the end turns. Accumulation of the common mode voltage in excess of a bearing breakdown voltage, and the associated potential for discharge through bearings between the stator and rotor and electrical discharge machining, is reduced or eliminated.

In certain embodiments, an apparatus includes an electric motor comprising a stator that includes a stator core and stator windings. The stator windings have first end turns at a first end of the electric motor and second end turns at a second end of the electric motor. A common mode voltage discharge shield is disposed proximate to and is capacitively coupled to the first end turns. A grounding strap connects the common mode voltage discharge shield to ground, so that common mode voltages between the stator core and a neutral for the electric motor have a low impedance path for discharge through the grounding strap.

In certain embodiments, an electric motor includes a stator including a stator core and stator windings. The stator windings have first end turns at a first end of the electric motor and second end turns at a second end of the electric motor. The electric motor further includes a rotor disposed within the stator windings. Bearings between the motor housing (which is electrically attached to the stator) and the rotor facilitate rotation of the rotor within the stator windings. A common mode voltage discharge shield is disposed proximate to and is capacitively coupled to the first end turns. A grounding strap connects the common mode voltage discharge shield to ground, so that common mode voltages between the stator core and a neutral for the electric motor have a low impedance path for discharge through the grounding strap.

In some embodiments, discharge of the common mode voltage through the grounding strap reduces discharge of the common mode voltage through bearings between the stator and a rotor for the electric motor.

In some embodiments, discharge of the common mode voltage through the grounding strap avoids electrical discharge machining (EDM) of bearing and bearing races for the electrical motor.

In some embodiments, discharge of the common mode voltage through the grounding strap reduces circulating current within the stator core.

In some embodiments, the common mode voltage discharge shield comprises an annular disk with a curved cross-section, the common mode voltage discharge shield fitting over and partially around the first end turns.

In some embodiments, an insulating material is disposed between the common mode voltage discharge shield and the first end turns.

In some embodiments, the stator windings are hairpin windings, and the neutral for the electric motor is a neutral ring.

In some embodiments, the stator windings are round windings, and the neutral for the electric motor is a neutral point.

In some embodiments, common mode voltage discharge shields are disposed proximate to end turns at both ends of the electric motor.

In some embodiments, the electric motor is a traction motor for an electric vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 3 is a simplified plan view of the metallic cover of FIG. 2, and FIG. 3A is a cross-sectional view taken at section line A-A in FIG. 3;

FIGS. 4 and 5 illustrate cross-sections for stator windings;

FIG. 7A illustrates a common mode voltage waveform for a pulse width modulated drive voltage on the three phase motor;

FIGS. 7B and 7C illustrate changes to the common mode voltage waveform of FIG. 7A as the pulse width modulated drive voltage is altered to increase torque;

DETAILED DESCRIPTION

FIGS. 1 through 3A, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

To reduce the size of passive components in power electronics for electric vehicle (EV) control systems, the switching frequency and the slew-rates are rising. This rise in switching frequency and slew-rate increases the bearing current and worsens the situation.

Figure 6:
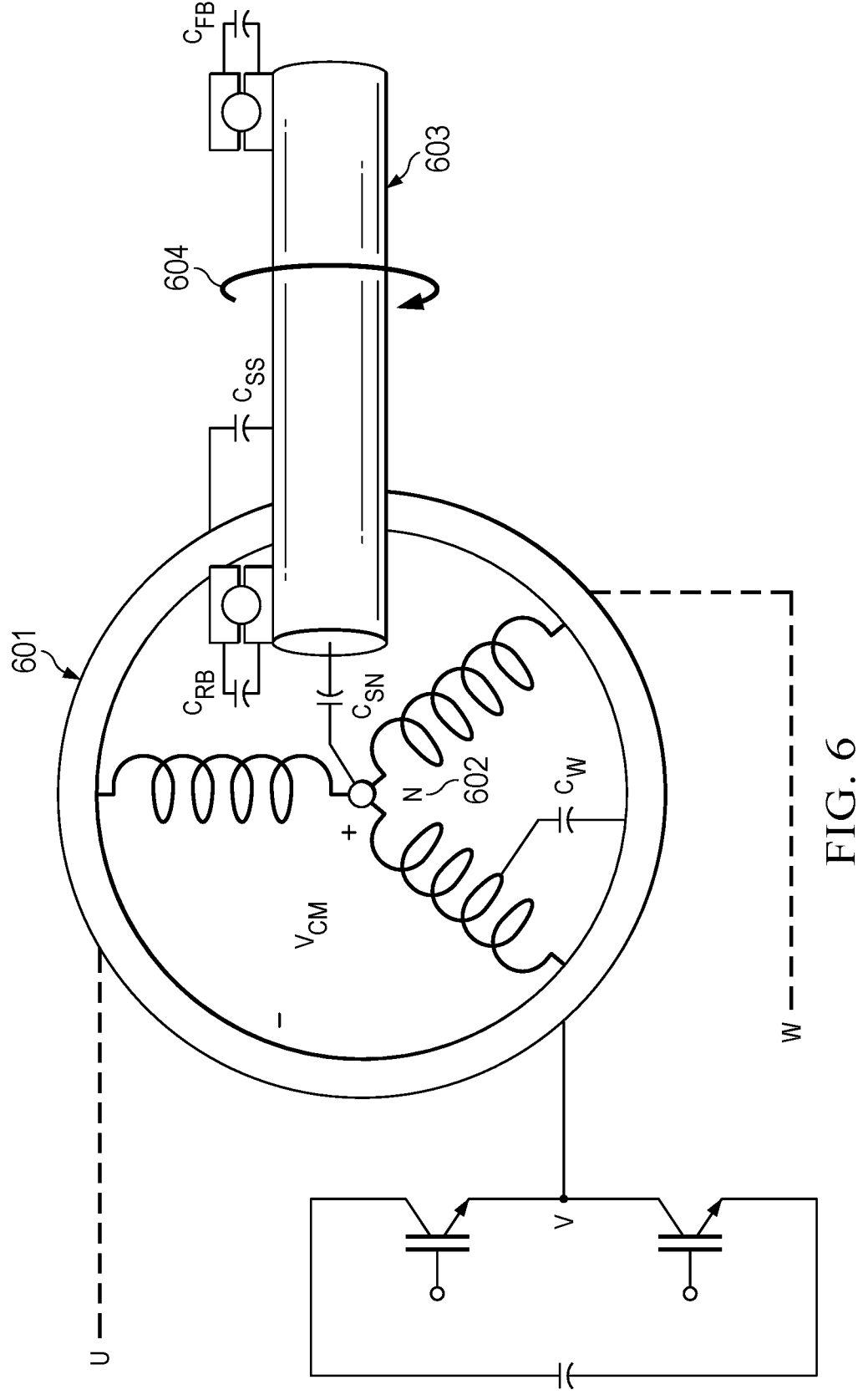
FIG. 6 diagrammatically illustrates common mode voltage and parasitic capacitances in the three phase motor.
Figure 6A:
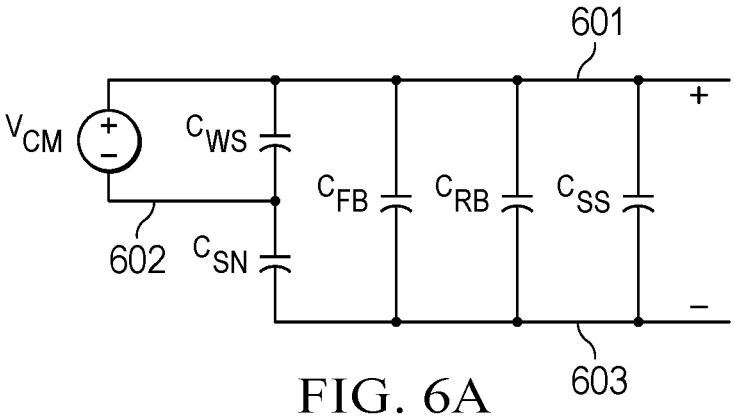
FIG. 6A is an equivalent circuit diagram for FIG. 6.

FIG. 6 diagrammatically illustrates common mode voltage and parasitic capacitances in the three phase motor, and FIG. 6A is an equivalent circuit diagram for FIG. 6. Stator for the three phase motor includes a stator core 601 and phase windings U, V, and W, between a neutral point (N) 602 and terminals labeled as U, V, and W in FIG. 6. Rotor 603 having a direction of rotation 604 rotates within the stator, held and rotating on front and rear bearings. The parasitic capacitances formed within the motor include: a front bearing capacitance $C_{FB}$ between the front bearing's inner race, attached to the rotor, and the stator core; a rear bearing capacitance $G_{RB}$ between the rear bearing's inner race, attached to the rotor, and the stator core; a rotor shaft to stator core capacitance $C_{SS}$; a rotor shaft to neutral (winding) capacitance $C_{SN}$; and a winding to stator core capacitance $C_{WS}$. As a result of those parasitic capacitances, the common mode voltage $V_{CM}$ between the neutral point 602 and the stator core 601 induces a proportional voltage across the bearings:

$$V_{Bearing} = V_{CM} \times \frac{C_{SN}}{C_{FB} + C_{RB} + C_{SS} + C_{SN}} = k \cdot V_{CM}.$$

When a balanced three phase sinusoidal voltage is applied to the motor, the common mode voltage $V_{CM}$ appearing at the motor neutral point will be 0 volts (V). Due to PWM control, in which a square waveform is applied to each phase of the motor, the common mode voltage is no longer OV, but instead will vary based on the control strategy, the duty cycle, and the modulation index. Typically, at motor output torque close to 0 Newton-meters (Nm), the common mode voltage waveform is close to a square shape, as illustrated in FIG. 7A. As the torque is increased, however, longer intermediate step(s) 701, 702 are added to the pulses, as shown in FIG. 7B. Further increasing torque changes the duration of the intermediate step for each pulse, at one or both of the leading pulse edge 703 and the trailing pulse edge 704 as shown in FIG. 7C. That is, common mode voltage waveform may not necessarily remain symmetric as the pulse duty cycle is varied torque in order to increase torque. In practice, there is also some ringing/oscillations due to resonance at each step transition.

Figure 8:
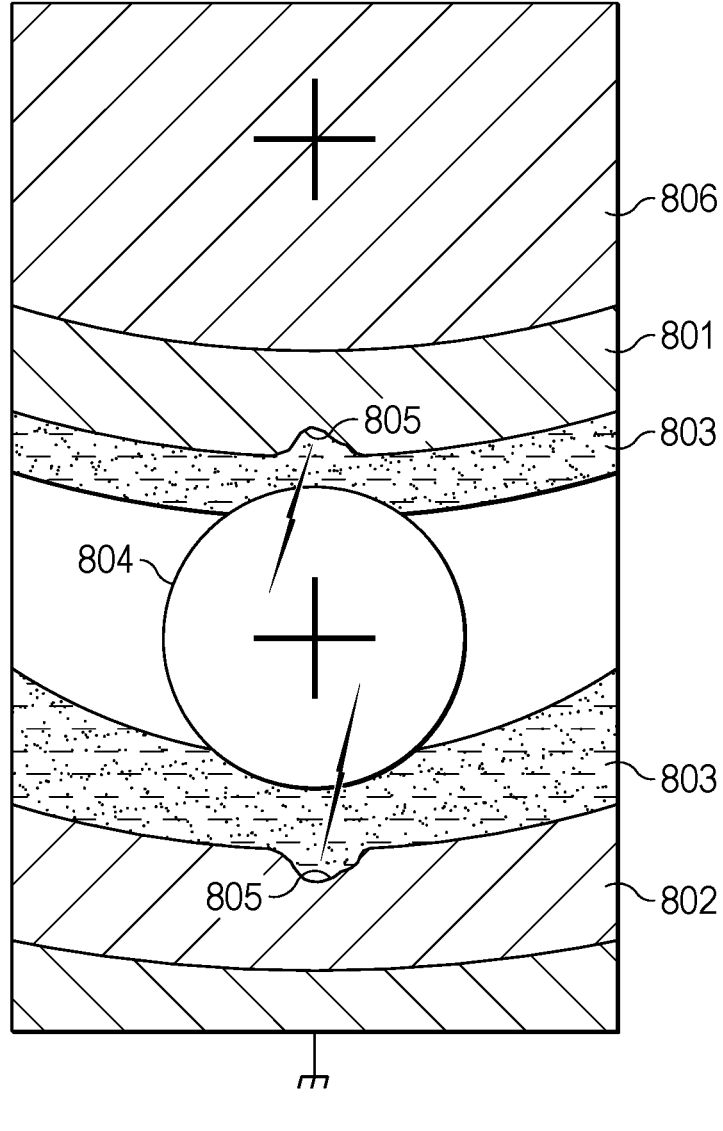
FIG. 8 illustrates discharge of common mode voltage through motor bearings.

Bearing current has two sources: common mode voltage resulting in EDM, and stator core circulating current. EDM results from voltage build up on that motor shaft 806 that eventually gets discharged through the bearing in form of electric current. PWM control of the motor, which applies a square pulsed waveform to the motor windings, causes the shaft voltage across the bearings relative to ground. The shaft/bearing voltage is built up across the inner and outer bearing races 801 and 802 retaining the bearing ball 804, as shown in FIG. 8. Once the built-up voltage exceeds the insulating capability of bearing's lubrication fluid 803, the voltage discharges through the bearing ball 804. That discharge heats and melts the metal of the bearing races 801 and 802, resulting in pits 805, which having edges that quickly cool and harden.

Figure 9A:
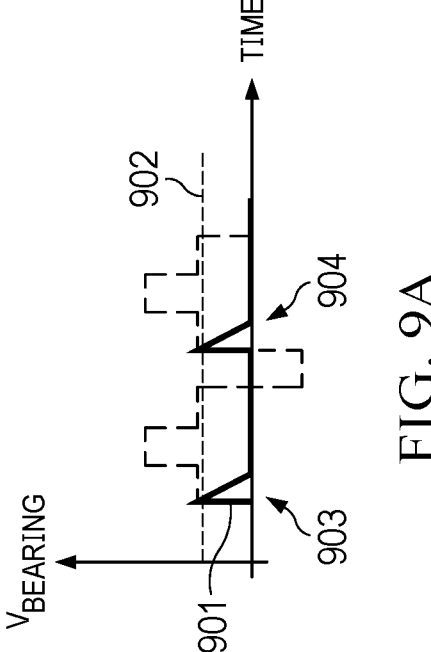
FIGS. 9, 9A, 9B, and 9C illustrate common mode voltage relative to bearing breakdown voltage and associated discharge events.
Figure 9C:
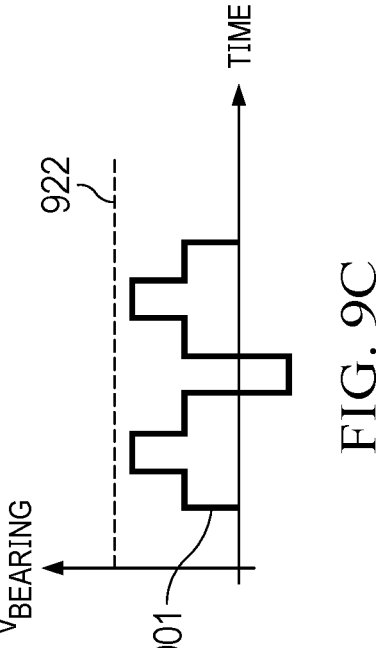
Figure 9:
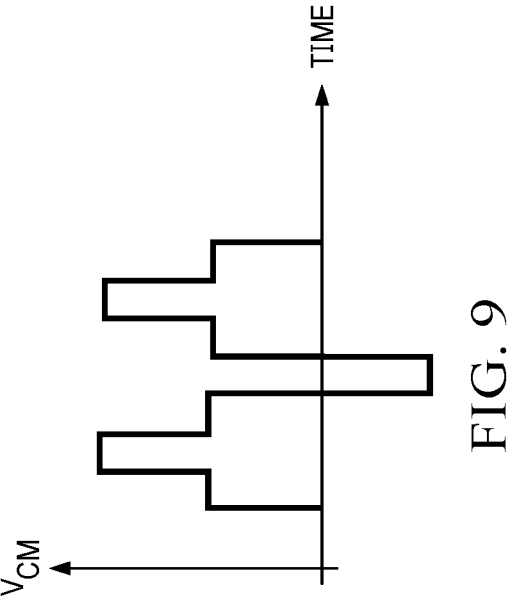
Figure 9B:
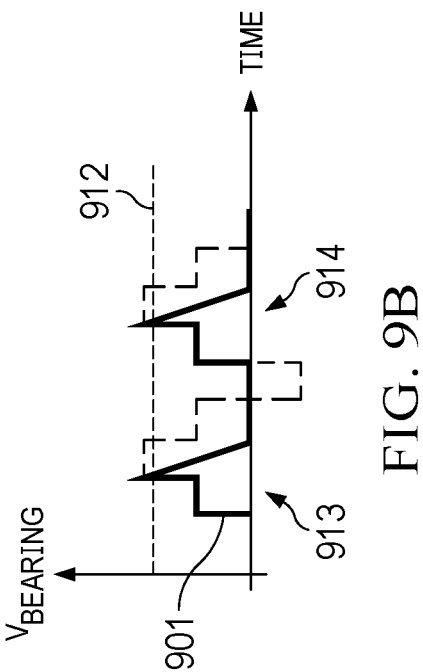

Occurrence of discharge events causing EDM depends on the actual shaft/bearing voltage. As shown by the equation above, shaft/bearing voltage $V_{Bearing}$ is proportional to the common mode voltage that appears on the motor neutral point. For a given common mode voltage, such as that illustrated in FIG. 9, the bearing voltage 901 will have a similar waveform in the absence of a discharge event, as shown in phantom in FIG. 9A. A discharge event 903, 904 occurs if and when the shaft/bearing voltage 901 goes beyond bearing breakdown voltage threshold 902. However, the bearing breakdown voltage 912 may vary depending on the lubrication fluid, the motor operating speed, etc., as shown in FIG. 9B, resulting in discharge events 913, 914 at different times during the waveform cycle and for a different magnitude voltage. Notably, the shaft voltage can also change as the motor speed and/or torque change, and as motor speed increases, the shaft tends to be floating and the bearing resistance/capacitance changes. Therefore, discharge events may only happen at an even higher voltage or, if the shaft bearing voltage 901 never exceeds the elevated bearing breakdown voltage threshold 922 as shown in FIG. 9C, may never occur.

As the operating torque changes, the rate of change dV/dt for the common mode voltage changes and, consequently, the shaft voltage potentially changes. Based on equation below, if ceramic bearings with very small capacitance (because impedance is too high) are used, then the shaft voltage can potentially increase as high in amplitude as the common mode voltage:

$$V_{Bearing} = V_{CM} \times \frac{C_{SN}}{C_{FB} + C_{RB} + C_{SS} + C_{SN}} \approx V_{CM}$$
$$\text{if} \begin{vmatrix} C_{FB} \approx 0 \\ C_{RB} \approx 0 \end{vmatrix}.$$

In practice, however, another discharge path through gearbox or the like will be created before the shaft/bearing voltage builds up to such a high level.

Figure 6B:
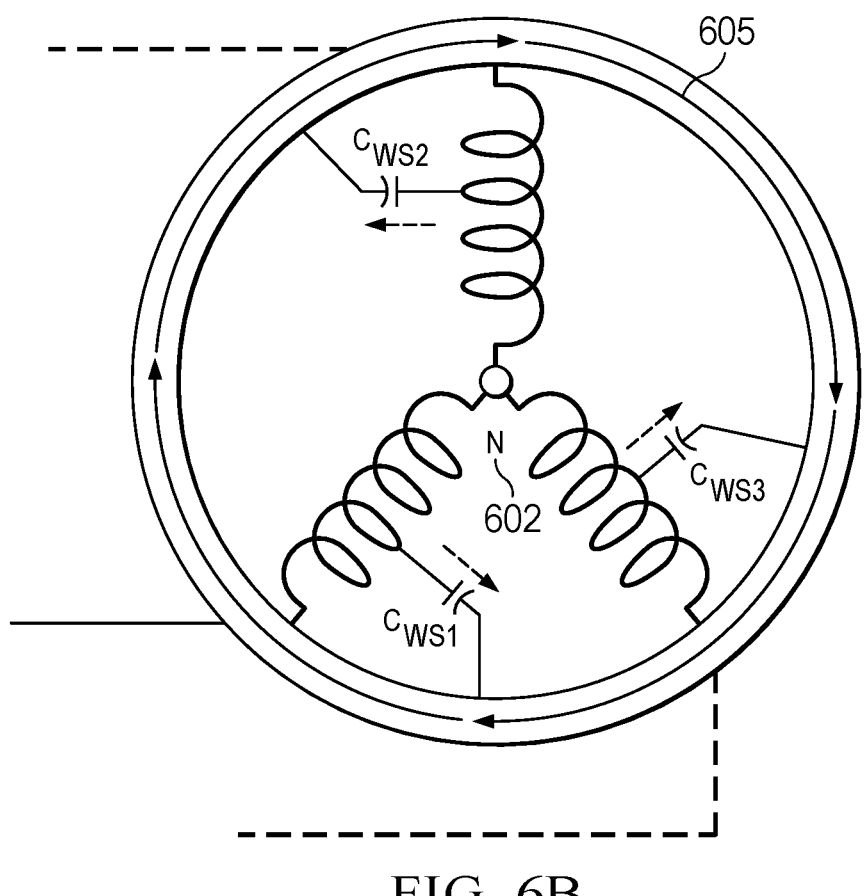
FIG. 6B illustrates parasitic winding capacitances.

As mentioned above, a second source of bearing current is stator core circulating current 605. Considering the equivalent circuit of FIG. 6A, it is apparent why the winding to stator core capacitance $C_{WS}$ does not appear in the above equations for the shaft/bearing current $V_{Bearing}$. However, the winding to stator core capacitance $C_{WS}$ does impact bearing current by creating a circulating bearing current. The high rate of change dV/dt at the motor windings discharges across the parasitic capacitances $C_{WS1}$, $C_{WS2}$, and $C_{WS3}$ to the motor stator depicted in FIG. 6B, creating ground/common mode current. The ground current creates a rotating magnetic field that induces a high frequency voltage on the shaft, which discharges through the bearing back to the stator core (not ground) and is therefore called circulating current. The cumulative $C_{WS}$ increases as stator length increases, such that circulating current typically becomes a bigger problem as the motor length increases in higher power motors.

Figure 1:
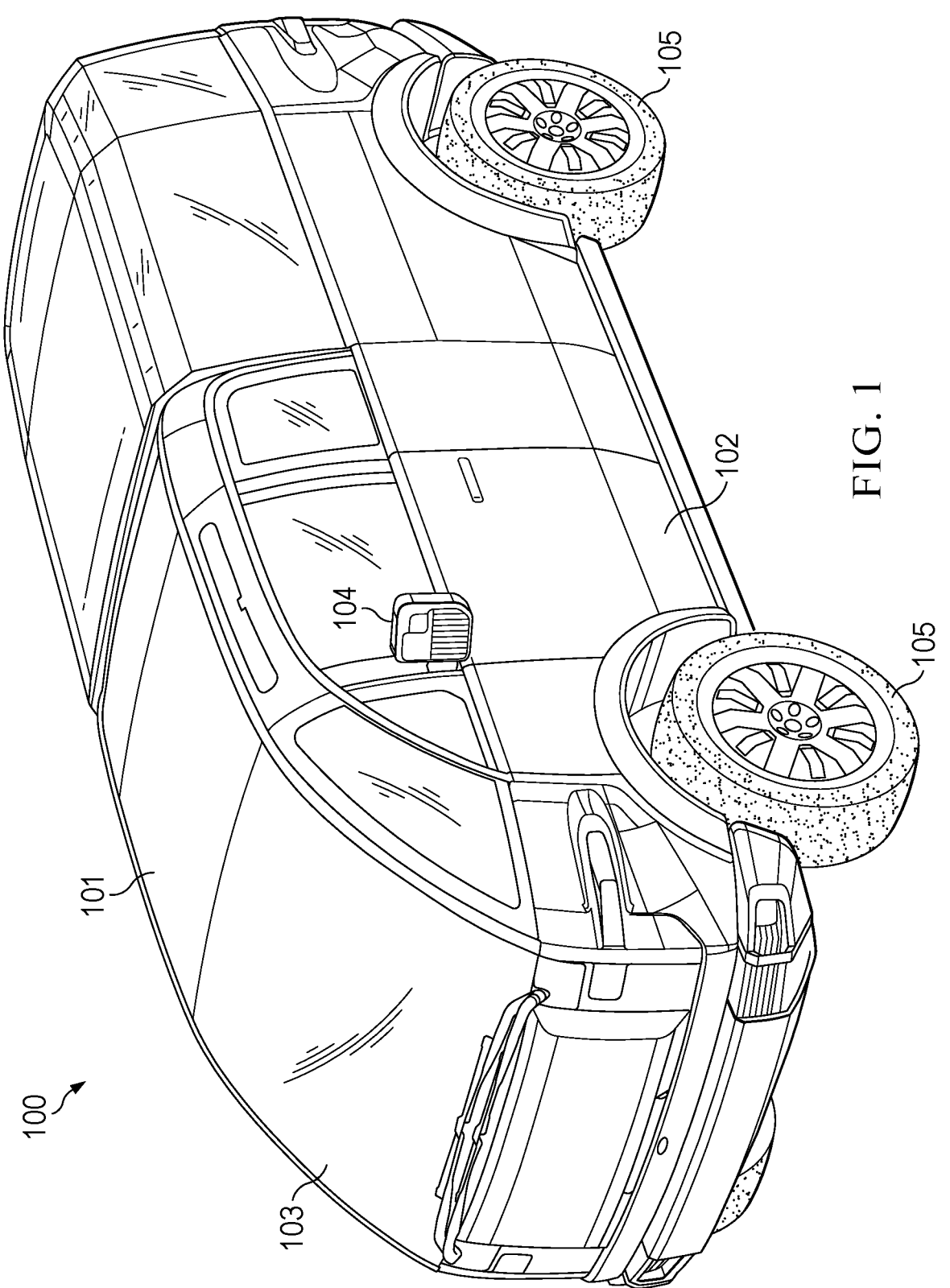
FIG. 1 is a perspective view of a vehicle 100 within which torque and heat generation is implemented in accordance with embodiments of the present disclosure.

FIG. 1 is a perspective view of a vehicle 100 within which shielding against shaft-induced common mode voltage is implemented in accordance with embodiments of the present disclosure. The embodiment of the vehicle 100 illustrated in FIG. 1 is for illustration and explanation only. FIG. 1 does not limit the scope of this disclosure to any particular implementation.

The vehicle 100 of FIG. 1 includes a chassis (not visible in FIG. 1) supporting a cabin 101 for carrying at least one passenger (the operator). The vehicle 100 is an electric vehicle (EV) in which the chassis in some embodiments is in the form of a "skateboard" vehicle platform supporting one or more energy storage elements (e.g., batteries) that provide input electrical power used by various components of the EV, such as one or more electric motors of the vehicle 100 and a control system of the electric vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an autonomous driving mode) to see outside the cabin 101. Rear view mirrors 104 mounted to sides of the cabin 101 enable the operator to see objects to the sides and rear of the cabin 101 and may include warning indicators (e.g., selectively illuminated warning lights).

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes an electric motor with shielding against shaft-induced common mode voltage.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1. In an exemplary embodiment, the electric motor described herein is a traction motor for the EV 100.

Figure 2:
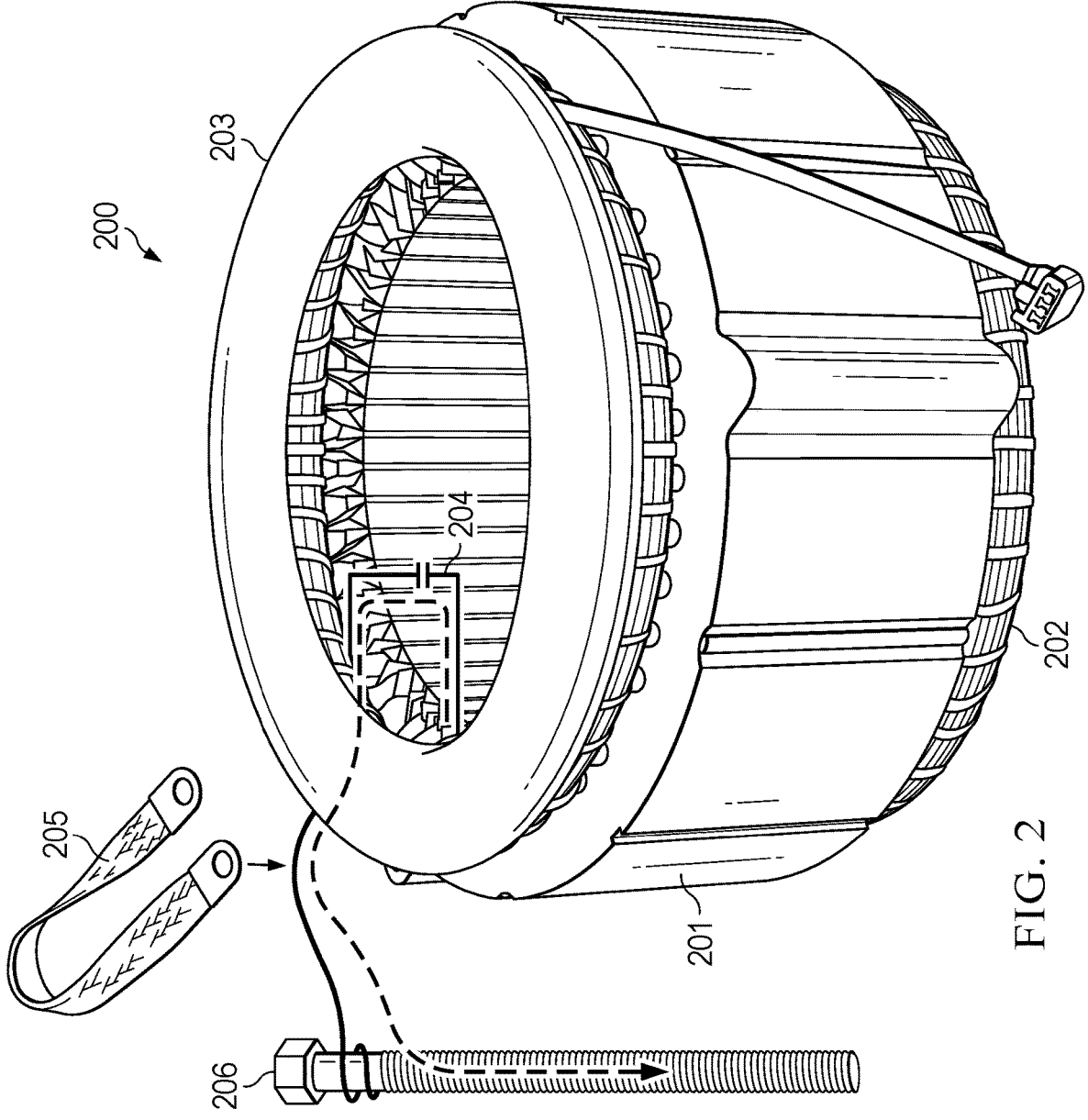
FIG. 2 diagrammatically depicts portions of an electric motor with shielding against shaft-induced common mode voltage, for use within an EV in accordance with embodiments of the present disclosure.

FIG. 2 diagrammatically depicts portions of an electric motor with shielding against shaft-induced common mode voltage, for use within an EV 100 in accordance with embodiments of the present disclosure. The embodiment of the electric motor 200 and associated shielding illustrated in FIG. 2 are for illustration and explanation only. FIG. 2 does not limit the scope of this disclosure to any particular implementation of shielding against shaft-induced common mode voltage.

FIG. 2 depicts a stator core 201 with windings 202 in accordance with the known art. A metallic cover 203 is provided around the end-turns of the windings, acting as electromagnetic shield against high dV/dt produced by common mode voltage at neutral point on the end-turn. While a single metallic cover 203 is depicted in FIG. 2, around the end-turns of the windings 202 at one end of the motor 200, a counterpart may be provided around end-turns of the windings 202 on the opposite end. FIG. 3 is a simplified plan view of the metallic cover 203 of FIG. 2, and FIG. 3A is a cross-sectional view of the metallic cover 203 in FIG. 3 taken at section line A-A. As depicted, metallic cover 203 is an annular disk with an arcuate or cup-shaped cross-section. Preferably, the metallic cover 203 extends substantially over the entire exposed end-turns of the windings 202, which may maximize capacitive coupling between the metallic cover 203 and the end-turns.

Metallic cover 203 is capacitively coupled 204 to the end turns and electrically connected to ground, to provide a path with lowest impedance for discharge of the high dV/dt current due to common mode voltage. Accordingly, the material of metallic cover 203 must have high electric conductivity, making aluminum or copper good choices. In order to effectively suppress the high dV/dt as a result of common mode voltage that would otherwise result in bearing discharge current otherwise, the metallic cover 203 must be grounded, which is easily implemented by one or more conductive grounding strap(s) 205 from the metallic cover 203 to the motor housing (e.g., through one or more mounting bolt(s) 206 for stator core 201). The mounting bolt(s) 206 provide a path between the common mode voltage shield and the housing of the stator (which may be aluminum). The stator core may be stainless steel, which is a poor electrical conductor as compared to aluminum. However, the mounting bolt(s) 206 extend through the stator's mounting holes and are screwed onto the stator housing, forming a highly conductive path through the aluminum stator housing.

In order to provide electrical isolation between the metallic cover 203 and the winding end-turns, the internal area of the metallic cover 203 is preferably covered by a non-conductive material (e.g., a Nomex insulation paper available from DuPont de Nemours, Inc.). That insulation paper preferably has negligible impact on penetration of the electric field from the stator windings 202 to the metallic cover 203.

FIGS. 4 and 5 illustrate cross-sections for stator windings. Stator windings may have a round cross-section as illustrated in FIG. 4, or (for hairpin windings) a rectangular cross-section as illustrated in FIG. 5. Bearing current due to shaft induced common mode voltage is a bigger issue in stators with hairpin windings, primarily because the electro-magnetic fields are stronger at sharp edges. In hairpin stator windings, the end-turns are welded together, and the weld points create sharp edges that, in turn, become a major source of electro-magnetic voltage induction onto the shaft. As a result, instead of a single neutral point where all three phases are connected, there is typically a neutral ring that goes all around the end-turns in stators with hairpin windings. That is, instead of a single common mode voltage point with high electromagnetic field concentration, there will be a ring of high common mode voltage all around the stator winding end-turns, further increasing the chance of induced shaft voltage. The metallic cover 203 works as effectively in stators having hairpin windings as those with round windings.

The present disclosure provides a low cost, easily implemented solution that can be readily integrated into the stator on the end-turns during manufacturing. Unlike other solutions, the shield of the present disclosure prevents shaft voltage build up by providing a path with a lower resistance. Therefore, unlike other approaches, the issue is not transferred from the bearings to the gearbox or other parts that are electrically coupled to the shaft. Since the shield provides lowest impedance path for discharge, due to proximity to the end-turns, circulating current is also prevented from forming on the stator core.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
an electric motor comprising a stator including a stator core and stator windings, the stator windings having first end turns at a first end of the electric motor and second end turns at a second end of the electric motor;
a common mode voltage discharge shield proximate to and capacitively coupled to the first end turns; and
a grounding strap connecting the common mode voltage discharge shield to ground, wherein a common mode voltage between the stator core and a neutral for the electric motor is discharged through the grounding strap.

2. The apparatus according to claim 1, wherein discharge of the common mode voltage through the grounding strap reduces discharge of the common mode voltage through bearings between the stator and a rotor for the electric motor.

3. The apparatus according to claim 2, wherein the discharge of the common mode voltage through the grounding strap avoids electrical discharge machining (EDM) of bearing and bearing races for the electrical motor.

4. The apparatus according to claim 2, wherein discharge of the common mode voltage through the grounding strap reduces circulating current within the stator core.

5. The apparatus according to claim 1, wherein the common mode voltage discharge shield comprises an annular disk with a curved cross-section, the common mode voltage discharge shield fitting over and partially around the first end turns.

6. The apparatus according to claim 1, further comprising:
an insulating material between the common mode voltage discharge shield and the first end turns.

7. The apparatus according to claim 1, wherein the stator windings are hairpin windings, and wherein the neutral for the electric motor is a neutral ring.

8. The apparatus according to claim 1, wherein the stator windings are round windings, and wherein the neutral for the electric motor is a neutral point.

9. The apparatus according to claim 1, wherein the common mode voltage discharge shield comprises a first common mode voltage discharge shield, the apparatus further comprising:
a second common mode voltage discharge shield proximate to and capacitively coupled to the second end turns.

10. An electric vehicle comprising the apparatus according to claim 1, wherein the electric motor comprises a traction motor for the electric vehicle.

11. An electric motor, comprising:

a stator including a stator core and stator windings, the stator windings having first end turns at a first end of the electric motor and second end turns at a second end of the electric motor;

a rotor disposed within the stator windings;

bearings between the stator and the rotor, the bearings facilitating rotation of the rotor within the stator windings;

a common mode voltage discharge shield proximate to and capacitively coupled to the first end turns; and a grounding strap connecting the common mode voltage discharge shield to ground, wherein a common mode voltage between the stator core and a neutral for the electric motor is discharged through the grounding strap.

12. The electric motor according to claim 11, wherein discharge of the common mode voltage through the grounding strap reduces discharge of the common mode voltage through bearings between the stator and a rotor for the electric motor.

13. The electric motor according to claim 12, wherein the discharge of the common mode voltage through the grounding strap avoids electrical discharge machining (EDM) of bearing and bearing races for the electrical motor.

14. The electric motor according to claim 12, wherein discharge of the common mode voltage through the grounding strap reduces circulating current within the stator core.

15. The electric motor according to claim 11, wherein the common mode voltage discharge shield comprises an annular disk with a curved cross-section, the common mode voltage discharge shield fitting over and partially around the first end turns.

16. The electric motor according to claim 11, further comprising:

an insulating material between the common mode voltage discharge shield and the first end turns.

17. The electric motor according to claim 11, wherein the stator windings are hairpin windings, and wherein the neutral for the electric motor is a neutral ring.

18. The electric motor according to claim 11, wherein the stator windings are round windings, and wherein the neutral for the electric motor is a neutral point.

19. The electric motor according to claim 11, wherein the common mode voltage discharge shield comprises a first common mode voltage discharge shield, the electric motor further comprising:

a second common mode voltage discharge shield proximate to and capacitively coupled to the second end turns.

20. An electric vehicle comprising the electric motor according to claim 11, wherein the electric motor comprises a traction motor for the electric vehicle.

* * * * *